US007760915B2

(12) United States Patent
Bhogal et al.

(10) Patent No.: US 7,760,915 B2
(45) Date of Patent: Jul. 20, 2010

(54) METHOD, SYSTEM, AND PROGRAM PRODUCT FOR ENCRYPTING INFORMATION

(75) Inventors: Kulvir S. Bhogal, Fort Worth, TX (US); Gregory J. Boss, American Fork, UT (US); Rick A. Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 11/539,730

(22) Filed: Oct. 9, 2006

(65) Prior Publication Data
US 2008/0085035 A1 Apr. 10, 2008

(51) Int. Cl.
*G06K 9/00* (2006.01)
(52) U.S. Cl. .................. 382/115; 235/375; 345/179; 380/40; 380/258; 382/186; 382/187; 382/314; 713/170
(58) Field of Classification Search .......... 235/375, 235/380, 454; 345/179; 380/44, 243, 258; 382/115, 186, 187, 314; 713/156, 168, 170; 715/541
See application file for complete search history.

(56) References Cited
U.S. PATENT DOCUMENTS

| 6,666,376 | B1 * | 12/2003 | Ericson | 235/454 |
|---|---|---|---|---|
| 6,836,555 | B2 | 12/2004 | Ericson et al. | |
| 7,278,017 | B2 * | 10/2007 | Skantze | 713/168 |
| 7,353,393 | B2 * | 4/2008 | Hansen et al. | 713/170 |
| 7,454,977 | B2 * | 11/2008 | Larsen et al. | 73/763 |
| 2002/0034300 | A1 | 3/2002 | Thuvesholmen et al. | |
| 2002/0035687 | A1 | 3/2002 | Skantze | |
| 2005/0024346 | A1 * | 2/2005 | Dupraz et al. | 345/179 |
| 2005/0173514 | A1 * | 8/2005 | Mackenzie | 235/375 |
| 2006/0159345 | A1 * | 7/2006 | Clary et al. | 382/186 |
| 2006/0267965 | A1 * | 11/2006 | Clary | 345/179 |
| 2007/0030257 | A1 * | 2/2007 | Bhogal et al. | 345/179 |
| 2007/0058868 | A1 * | 3/2007 | Seino et al. | 382/187 |
| 2008/0085035 | A1 * | 4/2008 | Bhogal et al. | 382/115 |

(Continued)

FOREIGN PATENT DOCUMENTS
JP       06-243296 A      9/1994

(Continued)

OTHER PUBLICATIONS

Persiano et al., "User Privacy Issues Regarding Certificates and the TLS Protocol", ACM Digital Library, 2000, pp. 53-62, ACM 1-58113-203-4/00/0011, CCS '00 Athens Greece.

(Continued)

*Primary Examiner*—Gregory M Desire
(74) *Attorney, Agent, or Firm*—William Schiesser; Hoffman Warnick LLC

(57) ABSTRACT

The invention provides a method, system, and program product for encrypting information. In one embodiment, the invention includes prompting a user for a password associated with a digital signature certificate stored in a digital pen, capturing a handwritten password made using the digital pen, displaying to the user the captured password, and encrypting information entered using the digital pen using the captured password. In some embodiments, the password may be captured from a predefined field on a digital page.

18 Claims, 4 Drawing Sheets

U.S. PATENT DOCUMENTS

2008/0118064 A1* 5/2008 Bhogal et al. ............... 380/243

FOREIGN PATENT DOCUMENTS

JP         2004280519 A1    10/2004

OTHER PUBLICATIONS

Janssen et al., "UpLib: A Universal Personal Digital Library System", ACM Digital Library, Nov. 20-22, 2003, pp. 234-242, ACM 1-58113-724-9/03/0011, Grenoble, France.

Elser et al., "Next Century Challenges: Data-Centric Networking for Invisible Computing", ACM Digital Library, 1999, pp. 256-262, ACM 1-58113-142-9/99/08, Seattle Washington.

* cited by examiner

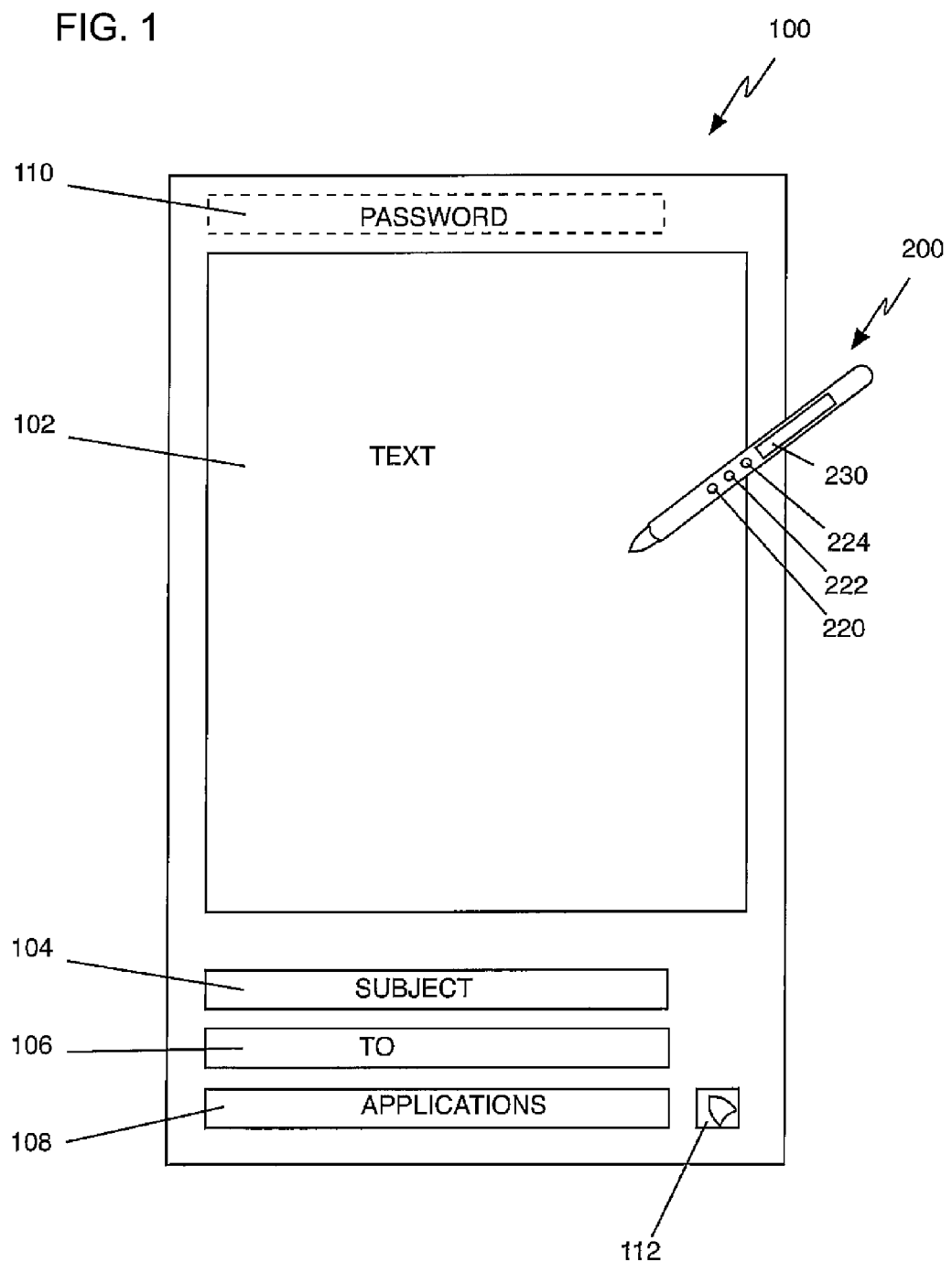

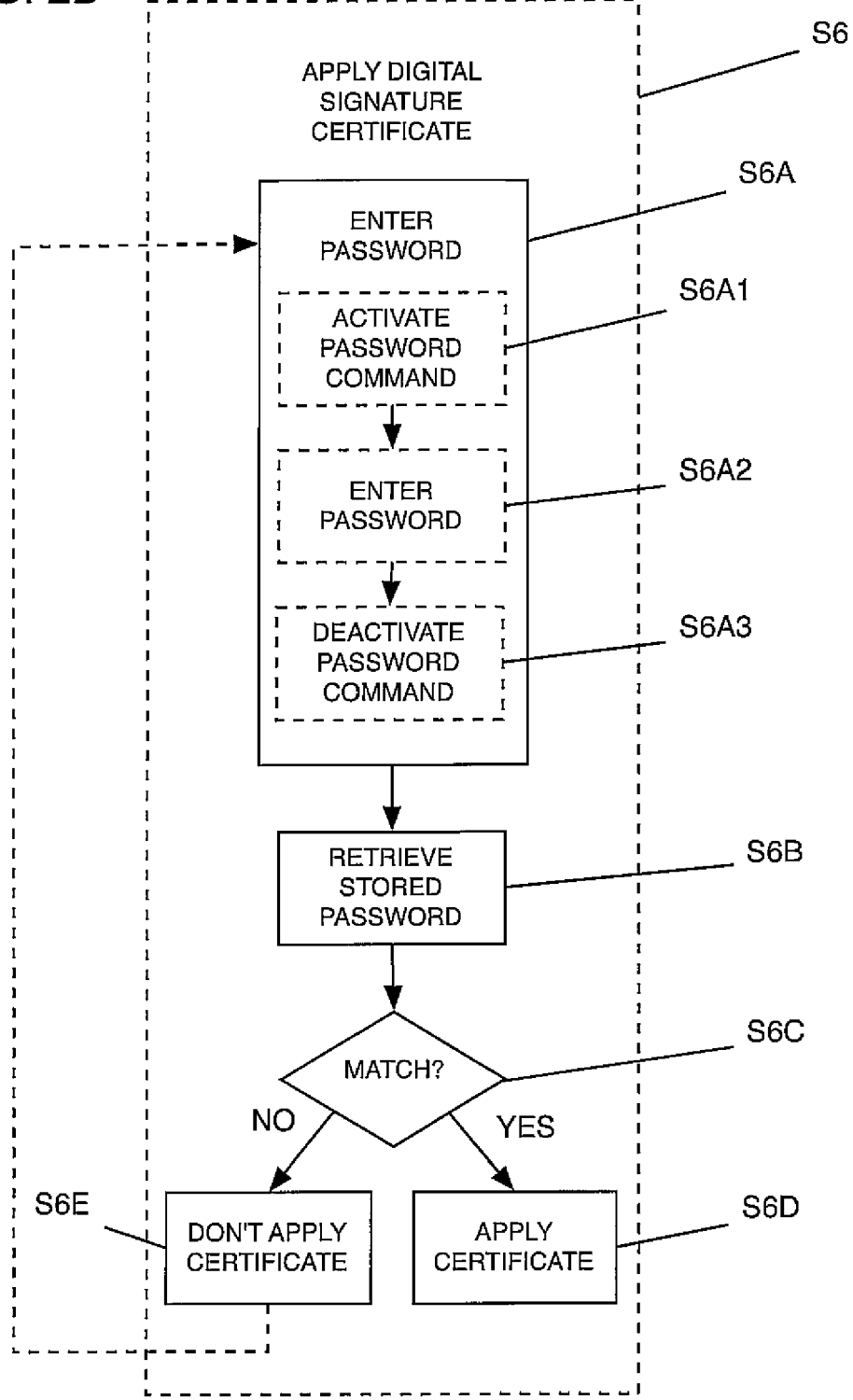

METHOD, SYSTEM, AND PROGRAM PRODUCT FOR ENCRYPTING INFORMATION

FIELD OF THE INVENTION

The invention relates generally to the encryption of information, and more particularly, to the encryption of information entered using a digital pen.

BACKGROUND OF THE INVENTION

Digital pens and related technologies have been gaining popularity due to their convenience and versatility. One of the advantages provided by digital pens is the ability to store handwritten information in the pen itself, eliminating the need to collect, transport, and/or store individual pieces of paper upon which such information may be written or to immediately download the stored information to a computing device.

However, this advantage also leads to one of the primary disadvantages associated with digital pens, namely, the potential for confidential or otherwise sensitive information to be compromised by the loss or unauthorized accessing of the digital pen. Thus, information stored in a digital pen may be unnecessarily exposed to compromise. This may violate not only good judgment and individual or business guidelines, but may also expose the user of the digital pen to liability for violation of local, state, or federal law (e.g., Health Insurance Portability and Accountability Act of 1996 (HIPAA), Sarbanes-Oxley Act of 2002, etc.).

Accordingly, there exists a need in the art to overcome the deficiencies and limitations described hereinabove.

SUMMARY OF THE INVENTION

The invention provides a method, system, and program product for encrypting information. In one embodiment, a method according to the invention comprises: prompting a user for a password associated with a digital signature certificate stored in a digital pen; capturing a handwritten password made using the digital pen; displaying to the user the captured password; and encrypting information entered using the digital pen using the captured password, wherein the handwritten password is captured from a predefined field on a digital page.

A first aspect of the invention provides a method for encrypting information, comprising: capturing a handwritten password made using a digital pen; and encrypting information entered using the digital pen using the captured password.

A second aspect of the invention provides a system for encrypting information, comprising: a system for capturing a handwritten password made using a digital pen; and a system for encrypting information entered using the digital pen using the captured password.

A third aspect of the invention provides a program product stored on a computer-readable medium, which when executed, encrypts information, the program product comprising: program code for capturing a handwritten password made using a digital pen; and program code for encrypting information entered using the digital pen using the captured password.

A fourth aspect of the invention provides a method for deploying an application for encrypting information, comprising: providing a computer infrastructure being operable to: capture a handwritten password made using a digital pen; and encrypt information entered using the digital pen using the captured password.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 1 shows illustrative examples of a digital pen and a sheet of digital paper useful in practicing the present invention.

FIG. 2B shows a detailed view of a step of the method of FIG. 2A.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 2A:
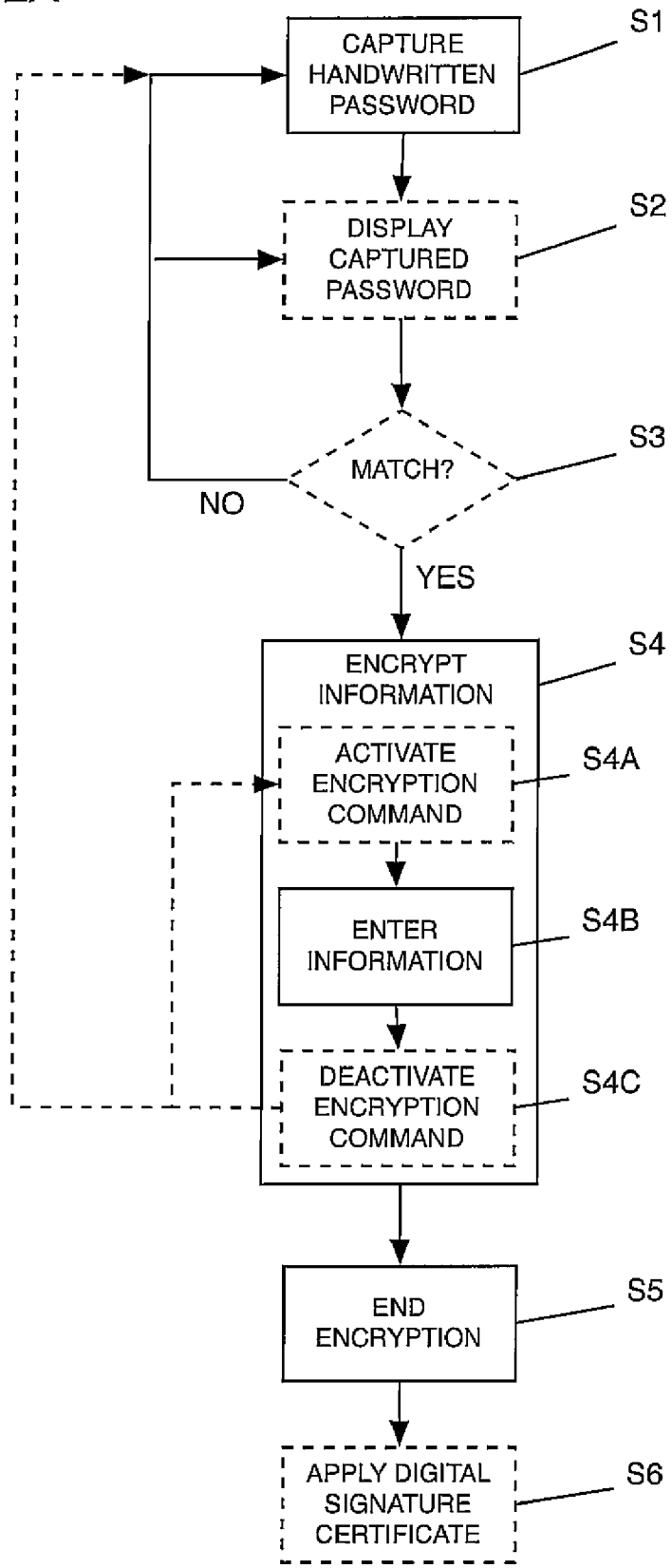
FIG. 2A shows a flow diagram of an illustrative method according to the invention.

As indicated above, the invention provides a method, system, and program product for encrypting information. More particularly, the invention involves the encryption of information entered with and stored in a digital pen using a password and/or digital signature certificate.

FIG. 1 shows illustrative examples of a sheet of digital paper 100 and a digital pen 200 useful in practicing the present invention. Digital paper 100 may be of any type, such as the Easybook® $M^3$ Digital Notepad available from Oxford or the digital notepad available from Esselte. Similarly, digital pen 200 may be of any type, such as the Logitech®io™$_2$ Pen, the Maxell DP-201 Digital Pen, or the Nokia SU-1B Digital Pen.

As is typical of many digital papers employing microdots, digital paper 100 includes a number of fields, including a text field 102 in which handwritten information may be entered, a subject field 104 in which a subject of the text in text field 102 may be entered, in the case that such text will be used in an electronic mail or other messaging system, a "to" field in which a name, email address, or other identifier may be entered, and an applications field 108 in which names, icons, or other identifiers of associated computer programs may be entered or selected. It should be recognized that text field 102 may include handwritten information other than text, such as graphics. In addition, while digital paper 100 is shown as typical of those employing microdots, it is also possible, based on the underlying technology of digital pen 200, to use an ordinary piece of paper, i.e., a non-digital paper, in practicing the present invention.

As will be explained in greater detail below, methods of the present invention include a user entering a handwritten password using digital pen 200. Such a password may be entered in any portion of digital paper 100, including text field 102. Alternatively, digital paper 100 may be provided with a predefined field for entry of such a password, such as password field 110. Digital pen 200 may therefore include a display 230, such as a liquid crystal display (LCD), for displaying to a user the handwritten password, as captured by digital pen 200.

As will also be explained in greater detail below, methods of the present invention include a user entering handwritten information to be encrypted and stored in digital pen 200. Accordingly, one or both of digital paper 100 and digital pen 200 may include fields, mechanisms, or devices for marking when such encryption is to begin and end. For example, digital paper 100 may include an entry box 112 in which a user may place a portion of digital pen 200 (e.g., its point) to mark the end and/or beginning of information to be encrypted. Similarly, digital pen 200 may include one or more toggles 220, 222, 224 or similar devices for marking the beginning and/or end of information to be encrypted.

Referring now to FIG. 2A, a flow diagram of an illustrative method according to the invention is shown. At step S1, a handwritten password is captured using a digital pen 200. At optional step S2, the handwritten password captured at step S1 is displayed using, for example, display 230. While the handwritten password is described herein as being captured using a digital pen, it should be recognized that other methods, mechanisms, and devices for capturing a handwritten password may similarly be used. Preferably, the handwritten password is captured using an optical-based method, mechanism, or device.

Next, at optional step S3, it is determined whether the handwritten password captured at step S1 matches a password stored in the digital pen 200. That is, in one embodiment of the invention, a digital pen 200 may contain the stored passwords of one or more users which are compared against a handwritten password captured at step S1. This may be particularly useful, for example, where more than one user will enter information using the same digital pen 200 and/or where the stored passwords are associated with stored digital signature certificates to be used in encrypting the handwritten information. In such an embodiment, step S1 may be preceded by a user being prompted to enter a password associated with a particular user or digital signature certificate. A user may optionally further choose a user name or other identifier or a digital signature certificate from among those stored in the digital pen 200 before entering a password. If the handwritten password captured at step S1 is determined not to match a stored password associated with a particular user or digital signature certificate (i.e., No at step S3), step S1 and/or optional step S2 may be iteratively looped. That is, another handwritten password may be captured at step S1 and/or the captured password may be redisplayed at step S2. As noted above, step S1 may be preceded by a user being prompted to enter a password. If the handwritten password captured at step S1 is determined to match a stored password associated with a particular user or digital signature certificate (i.e., Yes at step S3), handwritten information is encrypted at step S4.

Information encrypted at step S4 may employ any number of known or later-developed encrypting methods or technologies. In addition, step S4 may include a number of substeps, some of which are optional. For example, as shown in FIG. 2A, entering information to be encrypted at step S4B may be bracketed by optional steps S4A and S4C, in which an encryption command is activated and deactivated, respectively. For example, as noted above with respect to FIG. 1, a user may mark a start and/or end of information to be encrypted using, for example, entry box 112 on digital paper 100 or toggles 220, 222, 224 on digital pen 200.

In addition, steps S4A through S4C may be iteratively looped, such that a user may enter a first portion of information to be encrypted at step S4B, deactivate the encryption command at step S4C, and later activate the encryption command again at step S4A, at which time the user can enter a second portion of information to be encrypted at step S4B.

Similarly, where more than one user will enter information to be encrypted using the same digital pen 200, steps S1 through S4 may be iteratively looped, such that a password of a first user (a first password) is captured at step S1 and information entered by the first user is encrypted at step S4, at which time the first user deactivates the encryption command at step S4C and a password of a second user (a second password) is captured at step S1, etc. Such an iteration may involve any number of users and any number of "encryption periods" (i.e., steps S4A through S4C, described above) for each user.

Once all "encryption periods" of all users have been completed, encryption of handwritten information may be deemed ended at step S5. While shown as a separate step in FIG. 2A, it should be recognized that an end to encryption may simply comprise the last deactivation of the encryption command at step S4C by the last of a plurality of users. Alternatively, step S5 may comprise a separate command by one or more users indicating that each user has finished entering information to be encrypted.

As noted above, one or more digital signature certificates may be stored in digital pen 200. Accordingly, a user may choose to apply a digital signature certificate to the encrypted information at optional step S6. FIG. 2B shows a detailed view of step S6 of FIG. 2A.

It should be recognized that while optional step S6 is shown in FIG. 2A as following the encryption of handwritten information, it may alternatively precede such encryption. For example, optional step S6 may occur before step S1. Alternatively, in the case that optional step S6 includes the optional substeps S6A1 through S6D shown in FIG. 2B, optional step S6 may occur in place of steps S1 through S3 in FIG. 2A.

In any event, as shown in FIG. 2B, a digital signature certificate may be applied at step S6, which includes a number of substeps, some of which are optional. For example, a password may be entered at step S6A, which may, similar to step S4 described above, include the optional steps of activating a password command at step S6A1, entering the password at step S6A2, and deactivating the password command at step S6A3. As noted above, a number of passwords associated with a number of digital signature certificates may be stored in the digital pen. Accordingly, one or more stored passwords may be retrieved at step S6B and compared to the entered password (step S6A) at step S6C. If the password entered at step S6A and the password(s) retrieved at step S6B match (i.e., Yes at step S6C), the digital signature certificate is applied to the encrypted information at step S6D. If the passwords do not match (i.e., No at step S6C), the digital signature certificate is not applied to the encrypted information and, optionally, steps S6A through S6C are looped.

Figure 3:
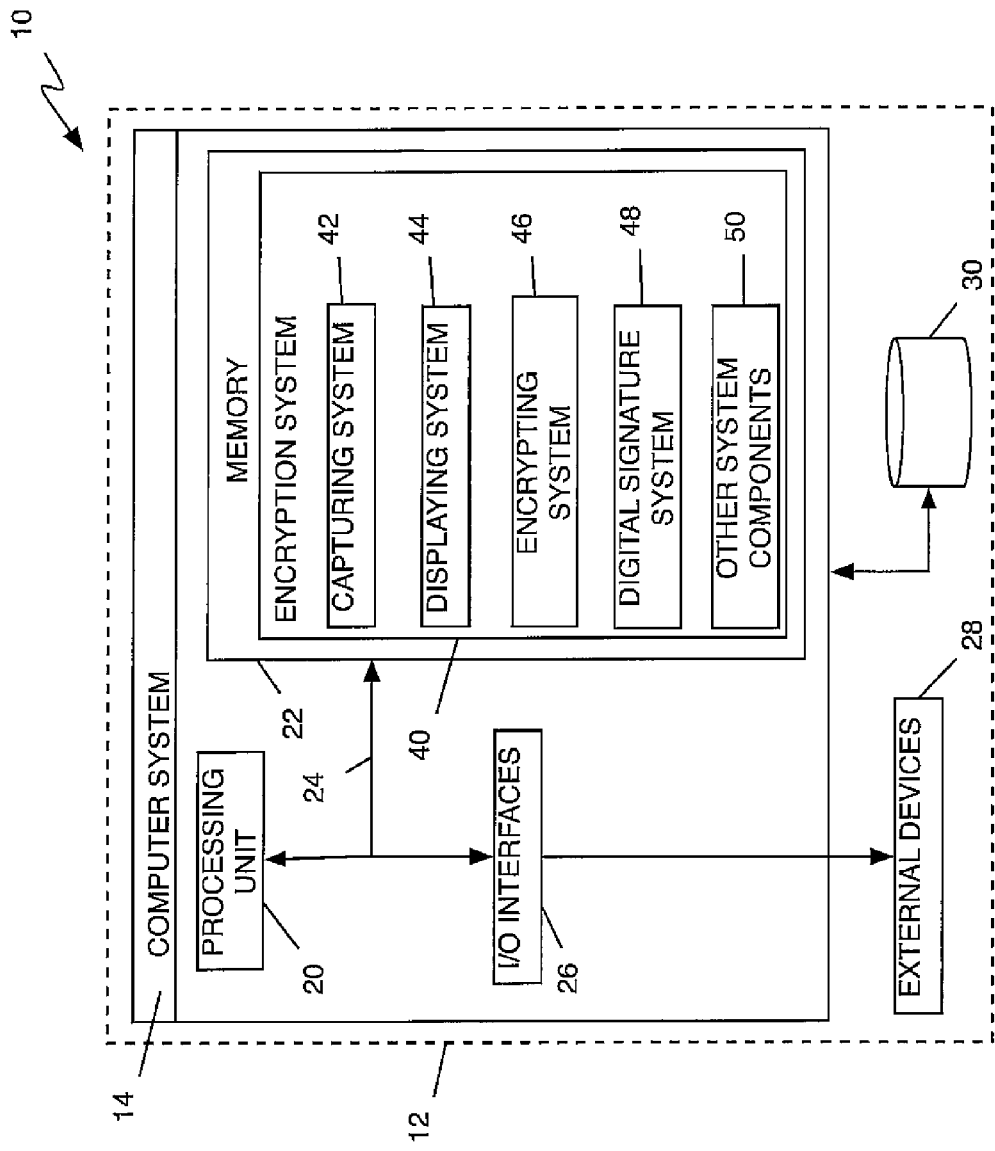
FIG. 3 shows a block diagram of an illustrative system according to the invention.

FIG. 3 shows an illustrative system 10 for encrypting information. To this extent, system 10 includes a computer infrastructure 12 that can perform the various process steps described herein for encrypting information. In particular, computer infrastructure 12 is shown including a computer system 14 that comprises an encryption system 40, which enables computer system 14 to encrypt information by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as encryption system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and encryption system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, encryption system 40 enables computer system 14 to encrypt information. To this extent, encryption system 40 is shown including a password capturing system 42, a password displaying system 44, an encrypting system 46, and a digital signature system 48. Operation of each of these systems is discussed above. Encryption system 40 may further include other system components 50 to provide additional or improved functionality to encryption system 40. It is understood that some of the various systems shown in FIG. 3 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for encrypting information, it is understood that the invention further provides various alternative embodiments. For example, in one embodiment, the invention provides a computer-readable medium that includes computer program code to enable a computer infrastructure to encrypt information. To this extent, the computer-readable medium includes program code, such as encryption system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to encrypt information as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for encrypting information. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for encrypting information, comprising:
capturing a handwritten password made using a digital pen; and
encrypting information entered using the digital pen using the captured password by:
activating an encryption command on the digital pen;
entering handwritten information to be encrypted using the digital pen; and
deactivating an encryption command on the digital pen.

2. The method of claim 1, further comprising:
prompting a user for a password associated with a digital signature certificate stored in the digital pen.

3. The method of claim 1, wherein the handwritten password is captured from a predefined field on a digital page.

4. The method of claim 1, wherein capturing includes:
activating a password command on the digital pen;
entering a handwritten password using the digital pen; and
deactivating the password command on the digital pen.

5. The method of claim 1, further comprising:
displaying to a user the captured password.

6. The method of claim 5, wherein displaying includes displaying using the digital pen.

7. The method of claim 5, further comprising:
prompting the user to confirm the captured password.

8. The method of claim 1, wherein encrypting includes:
encrypting a first portion of the information using a first password; and
encrypting a second portion of the information using a second password.

9. A system for encrypting information, comprising:
a system for capturing a handwritten password made using a digital pen; and
a system for encrypting information entered using the digital pen using the captured password, the system for encrypting permitting a user to:
activate an encryption command on the digital pen;
enter handwritten information to be encrypted using the digital pen; and
deactivate an encryption command on the digital pen.

10. The system of claim 9, further comprising:
a system for prompting a user for a password associated with a digital signature certificate stored in the digital pen.

11. The system of claim 9, wherein the handwritten password is captured from a predefined field on a digital page.

12. The system of claim 9, wherein the system for capturing includes:
a system for activating a password command on the digital pen;
a system for entering a handwritten password using the digital pen; and
a system for deactivating the password command on the digital pen.

13. The system of claim 9, further comprising:
a system for displaying to a user the captured password; and
a system for prompting the user to confirm the captured password.

14. The system of claim 9, wherein the system for encrypting includes:
a system for encrypting a first portion of the information using a first password; and
a system for encrypting a second portion of the information using a second password.

15. A program product stored on a computer-readable medium, which when executed, encrypts information, the program product comprising:
program code for capturing a handwritten password made using a digital pen; and
program code for encrypting information entered using the digital pen using the captured password, including:
program code for permitting a user to activate an encryption command on the digital pen;
program code for permitting a user to enter handwritten information to be encrypted using the digital pen; and
program code for permitting a user to deactivate an encryption command on the digital pen.

16. The program product of claim 15, further comprising:
program code for prompting a user for a password associated with a digital signature certificate stored in the digital pen.

17. The program product of claim 15, further comprising:
program code for displaying to a user the captured password.

18. A method for deploying an application for encrypting information, comprising:
providing a computer infrastructure being operable to:
capture a handwritten password made using a digital pen; and
encrypt information entered using the digital pen using the captured password by permitting a user to:
activate an encryption command on the digital pen;
enter handwritten information to be encrypted using the digital pen; and
deactivate an encryption command on the digital pen.

* * * * *